Feb. 11, 1969  R. W. FLETCHER  3,427,203
LARGE SURFACE AREA ELECTRODES AND A METHOD FOR PREPARING THEM
Filed July 20, 1966

United States Patent Office 3,427,203
Patented Feb. 11, 1969

3,427,203
LARGE SURFACE AREA ELECTRODES AND A METHOD FOR PREPARING THEM
Robert W. Fletcher, Madison, Wis., assignor to ESB Incorporated, Philadelphia, Pa., a corporation of Delaware
Filed July 20, 1966, Ser. No. 566,620
U.S. Cl. 136—120          14 Claims
Int. Cl. H01m 13/06

ABSTRACT OF THE DISCLOSURE

A large surface area electrode having amalgamated metal particles bonded together by an inorganic metal oxide or silicate bonding agent. The amalgamated metal particles and the inorganic bonding agent are formed into an intimate mixture which is contacted with an acid or alkaline bonding solution, and while in contact with both the inorganic bonding agent and the bonding solution, the amalgamated metal particles are heated to effect the bond whereby a structurized, high surface area electrode is formed. The inorganic bonding agent is selected from zinc oxide, calcium oxide, barium oxide, magnesium oxide, aluminum oxide, iron oxide, sodium silicate, potassium silicate or calcium silicate.

---

This invention relates to large surface area electrodes and a method for preparing them. In particular, this invention relates to large surface area electrodes prepared from amalgamable metals and a method for preparing them whereby they maintain their large surface area throughout cell assembly and after cell closure.

In the battery art, many attempts have been made to improve cell performance by increasing the electrode surface area and thereby providing for more complete utilization of the active material. The recent trend has been to form electrodes from powdered metals, such as zinc, which have a greater effective surface area than electrodes of the same size prepared from flat or corrugated zinc sheet. However, powdered metal electrodes also have disadvantages. Generally, the powdered metal particles are compressed to form electrode structures, and if insufficient pressure is used, the electrodes are structurally weak, whereas excessive pressure destroys much of the increased surface area.

Another method for overcoming the structural weakness of powdered metal electrodes is to incorporate a binder such as plastic resin into the powdered active material. Of course, the presence of a binder reduces the amount of a given space which can be occupied by active material. The plastic resin binders also tend to reduce the electrode effective area and must be thoroughly and homogeneously mixed with the active material in order to produce a uniform electrode structure.

While working with powdered amalgamated zinc to prepare mercury and manganese dioxide cells of the AA size, it was discovered that loose amalgamated zinc particles immersed in potassium hydroxide electrolyte solution containing zinc oxide tended to adhere to each other and formed a self-supporting structure. This observation was developed to provide a method for preparing a bonded electrode by heating amalgamated metal particles in the presence of a bonding solution containing a metal oxide or silicate bonding agent.

It is an object of this invention to provide a method for preparing a bonded electrode structure having a large surface area.

Another object of the invention is to provide a method for preparing a bonded electrode in situ in a cell container.

A further object of the invention is to provide a bonded electrode whose large surface area is maintained throughout cell assembly and after cell closure.

A still further object of the invention is to provide a bonded electrode having improved high rate capability and improved low temperature performance.

Other objects and advantages of this invention may be determined from the following clear and complete description of the invention, and in particular, in view of the drawings in which.

Figure 1:
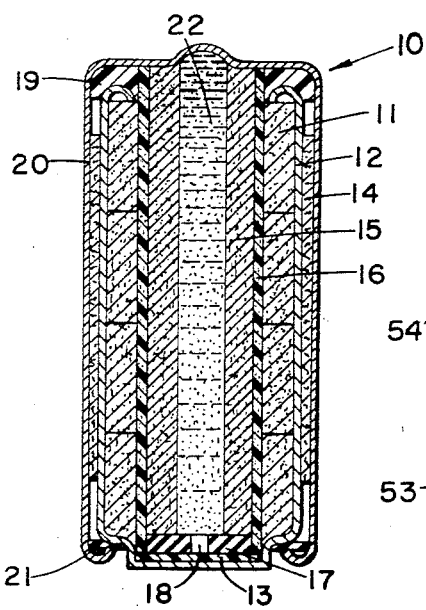
FIGURE 1 is a cross-sectional view of a primary cell having a bonded electrode in accordance with this invention.

It has been discovered that a large surface area electrode can be prepared from amalgamated metal powder by heating the powder in the presence of a metal oxide or a silicate bonding agent and a bonding solution which bonds the metal particles so as to structurize them. This type of electrode will hereinafter be referred to as a bonded electrode. It has been found that the bonded electrodes have greater porosity (surface area) and lower density than compressed metal powder electrodes, and they have sufficient structural strength to withstand the crimping force which is applied to the cell to close it. One of the advantages of the bonded electrodes of this invention is that they are not compacted upon closure of the cell, and therefore, they maintain their large surface area. As a result of the increased surface area, the bonded active material is more efficiently utilized as demonstrated by improved high rate capability and low temperature performance.

The preparation of a bonded electrode in accordance with this invention is dependent upon several factors. The metal powder which functions as the active material must be amalgamable and should contain at least 1% by weight of mercury, with from about 3 to 7% by weight of mercury being particularly preferred. The mercury helps to form a stronger bond, and the bonding rate is generally faster in the presence of greater amounts of mercury. Examples of amalgamable metals which are currently used as active materials in battery systems are zinc, cadmium, copper, silver and lead. In order to reduce raw material cost, the mercury content should be kept to a minimum, but it appears that gas evolution during the operation of a cell containing a bonded electrode increases as the amount of mercury is decreased, and it is imperative that gas evolution be held within tolerable limits, particularly in sealed cells.

It has been found that smaller particles of amalgamated metal bond together to form stronger electrodes than do larger amalgamated particles, but they do not form the best electrodes with respect to electro-chemical properties, i.e. battery performance. As a compromise, a particle size distribution ranging from —20 to +200 sieve size (U.S. Standard series) is generally satisfactory, with a particle size distribution between —40 to +100 being particularly preferred.

In order to bond the metal particles, it is necessary to bring them into contact with both a bonding agent and a bonding solution which may be either acid or alkaline depending upon the bonding agent and the metal particles. If the bonded electrodes are to be used in an alkaline cell, it is generally preferred to use an alkaline bonding solution. Examples of bonding agent which can be used are metal oxides or silicates such as zinc oxide, calcium oxide, magnesium oxide, iron oxide, alumina, and sodium, potassium or calcium silicate. The bonding agent may be dissolved or dispersed in the bonding solution, or it can be intermixed with the amalgamated metal particles. The bonding agent may be present in amounts ranging from about 1% by weight of bonding solution up to that amount which saturates the bonding solution. A particularly preferred bonding solution is a conventional alkaline electrolyte containing zinc oxide (bonding agent) in the form of zincates. (See U.S. Patent No. 2,422,045 issued to Samuel Ruben on June 10, 1947.)

In addition to the above-mentioned factors, it has been found that the amalgamated metal particles and/or the bonding solution should be heated during the bonding process, i.e. the simultaneous contacting of the metal particles, the bonding solution and the bonding agent. This may be accomplished by heating the metal particles or the bonding solution prior to bringing them into contact while they are still hot, or they can be heated after they are admixed. In general, temperatures ranging from about 150° F. to about 250° F. applied for periods of from about 1 to 15 minutes have been found satisfactory. If the bonded electrode is very small, such as in a "button-type" cell, the bonding may be effected by heating for less than 1 minute. The heat is necessary to improve the strength of the bond and to increase the rate of the bond formation so as to make the process practical. As previously indicated, the particular temperature employed and the duration of the heat treatment will vary depending upon the size of the electrode and the bond strength which is required.

A better understanding of this invention may be had by referring to the drawings. As shown in FIGURE 1, a primary cell 10 is constructed by placing four cathode mix cylinders 11 in an inner cell container 12 which comprises the cathode (positive) assembly, with the inner cell container 12 functioning as the positive terminal. The cathode mix cylinders 11 are prepared from a composition containing manganese dioxide and graphite. The four cathode mix cylinders are consolidated inside the inner cell container by means of a hydraulic press, after-which an insulator disc 13 is secured to the bottom of the inner cell container by means of an adhesive cement and a concentric insulator tube 14 is placed around the inner cell container.

The anode (negative) assembly utilizes a bonded zinc anode made in accordance with this invention. The bonded zinc anode 15 is prepared by filling the space between two concentric parchment containers having different diameters with loose amalgamated zinc powder, e.g. 14% mercury-zinc amalgam. Then the cylindrical-shaped amalgamated zinc powder between the containers is placed in 40% potassium hydroxide bonding solution containing about 7.4% by weight of zinc oxide and which is heated to about 190° F. The amalgmated zinc cylinder remains in the hot alkaline solution for about 15 minutes, after which it is removed along with the parchment containers and allowed to stand and cool in the air for about two minutes. Then the parchment containers are removed, and the bonded zinc cylinder is immersed in dilute acetic acid to neutralize the alkaline bonding solution, washed in distilled water and air dried.

The resulting bonded, amalgamated zinc cylinder is placed in a cylindrical separator tube 16 which may be made of microporous plastic ("Porothene") or an alkali resistant cellulosic material. Prior to inserting the bonded zinc cylinder into the separator tube, a compression plug 17 made of soft rubber or other suitable resilient insulating material is placed in the separator tube. The compression plug has a hole 18 therein to provide the alkaline electrolyte solution 22 with access to the interior of the bonded zinc anode assembly.

After the bonded zinc anode assembly is completed, the complete primary cell is assembled. The inner cell container 12, which contains the cathode 11 and has the insulator tube 14 placed thereon, is placed in a tray and about 2.55 grams of 40% potassium hydroxide electrolyte solution 22 containing 7.4% of zinc oxide is pipetted into the container. Then the anode assembly, comprising the bonded zinc anode, the separator tube and the compression plug, are inserted into the inner cell container and the electrolyte passes into the anode assembly through the hole in the compression plug and some of it is also absorbed by the separator 16.

An inner grommet 19 is placed around the separator tube 16 and is pushed into contact with the top of the inner cell container 12. The the outer cell container 20 is placed over the complete anode and cathode assembly. An outer grommet 21 is placed on the boss area of the end of the inner cell container and the outer cell container edge is crimped upon the outer grommet by means of a hydraulic press. Simultaneous with this closure operation, the outer cell container is being pressed into contact with the bonded zinc anode. Bonded electrodes made in accordance with this invention have sufficient compressive strength to withstand this closure force.

Figure 2:
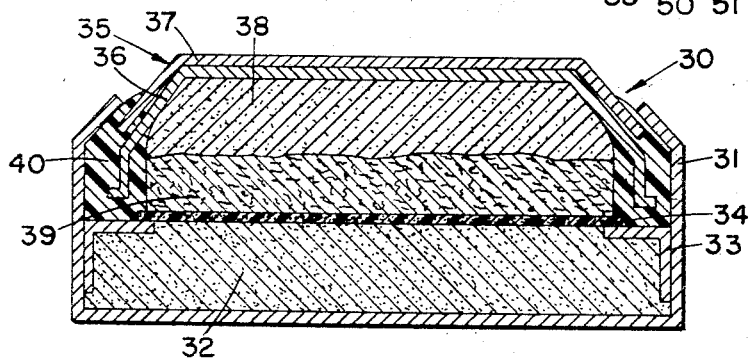
FIGURE 2 is a cross-sectional view of another type of primary cell having a bonded electrode prepared in situ in the cell container; and, FIGURE 3 is a cross-sectional view of a primary cell substantially similar to the cell illustrated in FIGURE 1, but having a different anode construction.

In FIGURE 2, there is illustrated a different type of primary alkaline cell 30, and in this cell, the zinc anode may be bonded in situ in the container. The cup-shaped cathode container 31 of steel or other suitable metal contains a depolarizing cathode material 32 comprising an oxygen yielding component such as mercuric oxide, manganese dioxide or silver oxide. The cathode material is compressed into a disc and is then inserted into the container with a retainer ring 33 placed over it to hold it in place and to support the barrier 34. The barrier is a disc-shaped microporous material such as regenerated cellulose or a microporous plastic, e.g. polyvinyl chloride.

The anode container 35 comprises an inner container 36 and an outer container 37 which fits over and is welded to the inner container. The anode container is placed in a tray in such a manner as to receive the amalgamated zinc powder which is processed to form the bonded zinc anode 38. One method for preparing the bonded zinc anode comprises preheating the anode container 35 to approximately 190° F., removing the container from the heat source, metering about 0.25 grams of amalgamated zinc powder into the container, and leveling the zinc powder in the can on a vibrator. It is essential that the zinc powder be leveled prior to bonding it in order that the anode will have a uniform thickness and to facilitate the centering of the absorbent separator 39 and the barrier 34. After the zinc powder is leveled, the zinc filled container is again heated to about 190° F. for approximately one minute. Then about 0.028 gram of 40% potassium hydroxide solution containing zinc oxide is metered into the hot zinc powder and the bonding of the zinc begins. In this instance, the alkaline solution functions as both the bonding solution and a portion of the cell electrolyte. It is preferred that the amalgamated zinc powder be heated so as to increase the zinc bonding rate to provide a structurally sound zinc anode prior to closure of the cell. The initial addition of alkaline solution should be sufficient to wet substantially all of the loose zinc particles, otherwise they will not be bonded. Generally, the initial alkaline solution addition may range up to about 25% by weight of the total cell electrolyte requirement.

An additional advantage can be achieved by using an anode container 35 in which the inside surface of the inner container 36 is amalgamated. In this instance, the amalgamated zinc particle will bond to the amalgamated surface of the container in addition to bonding to each other. The bond between the container and the zinc particles has sufficient strength to withstand normal shock and vibration and prevents the zinc from losing contact with the container which could result in cell failure.

After the initial addition of potassium hydroxide solution (electrolyte) to the zinc powder, an electrolyte absorbent mat of alkali resistant cellulosic material 39 is placed on the zinc anode 36, and then the balance of the alkaline electrolyte required to operate the cell is metered into the absorbent separator. Generally, the total amount of electrolyte present in this type of cell is about 0.15 gram. Thereafter, the barrier 34 is placed on the absorbent separator, and the anode and cathode assemblies are ready to be combined.

Prior to final assembly, a grommet 40 of insulating material is placed on the anode container. Then the cathode assembly is placed on the anode in such a manner that the cathode container fits over the grommet and the retaining ring 33 is in contact with the barrier 34. The cell is closed by crimping the cathode container inward against the anode container. It will be apparent to those skilled in the art that the bonded zinc anode may be prepared external to the anode container and then inserted therein, rather than in situ in the anode container.

Bonded electrodes prepared in accordance with this invention are not limited to amalgamated zinc, for they can be prepared from any amalgamable metal which is a useful battery active material, such as cadmium, copper, lead or silver. The bonded electrodes may contain a conductive and/or supporting element such as a metal sheet, e.g. silver, zinc or copper. It has been found that amalgamated metal particles can be effectively bonded to an electrically conductive metal sheet using the bonding agents and bonding solutions of this invention, and a particularly strong bond is formed when using an amalgamated metal sheet. In cylindrical cells a conductive metal element may be incorporated into the amalgamated metal particles, prior to bonding, in such a manner that a portion of the metal element protrudes from the mass of metal particles. After the bonding procedure, the metal particles will be bonded to themselves and to the metal element to form a unitary structure. One advantage achieved by using a metal element in this manner is that the entire bonded electrode assembly can be handled by means of that portion of the metal element protruding from the bonded metal particles. This helps to prevent contamination of the bonded metal particles and possible damage to the particle-to-particle bond during handling.

Figure 3:
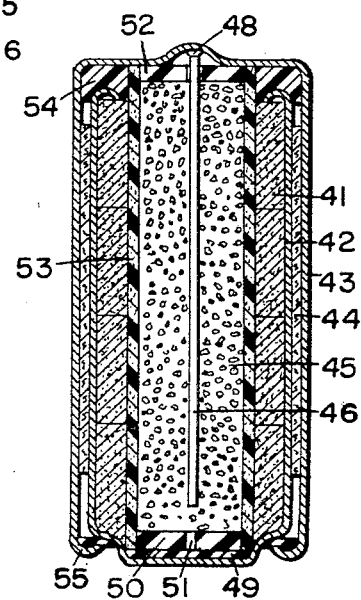

Referring to FIGURE 3, the illustrated primary cell comprises a cathode 41 in an inner cell container 42 which also functions as the positive terminal. The cathode is prepared from a composition containing manganese dioxide and graphite. The inner container 42 is separated from the outer container 43 by a concentric insulator tube 44. The anode 45 is a bonded zinc anode made in accordance with this invention and contains a conductive metal element 46 which has a portion protruding from the bonded zinc particles. This portion of the metal element contacts the outer container at 48 and may be permanently attached thereto by welding. The bonded zinc anode is separated from the inner cell container 42 by an insulator disc 49 and a compression plug 50 made of soft rubber or other suitable resilient insulating material. The compression plug has a hole 51 therein to provide access for the alkaline electrolyte solution which is contained in the porous bonded zinc anode. Another compression plug 52 is placed on top of the bonded zinc anode. The cathode 41 and the bonded zinc anode 45 are separated by a cylindrical separator tube 53 which may be made of microporous plastic or an alkali resistant cellulosic material. The inner container 42 and the outer container 43 are also separated by grommets 54 and 55.

The improved performance of cells having bonded electrodes prepared in accordance with the invention is illustrated in the following examples:

Example I

Two primary alkaline cells of the 675 size were prepared, utilizing mercuric oxide as the cathode material and amalgamated zinc powder as the anode material. One of the cells (control) was manufactured in accordance with standard procedures including a compressed zinc powder anode. The other cell was identical except for the anode which was bonded zinc prepared in situ using zinc oxide as the bonding agent and a 40% potassium hydroxide (KOH) bonding solution in accordance with this invention. These cells were tested for their low temperature performance. The following results were obtained for a 300 ohm continuous discharge to a 0.90 volt endpoint at 25° F.:

|  | Average Voltage (v.) | Duration (hrs.) | Capacity (ma. hrs.) |
|---|---|---|---|
| Bonded Zinc Anode | 1.068 | 15.2 | 54.0 |
| Compressed Zinc Anode | 1.032 | 4.08 | 14.01 |

The low temperature superiority of the bonded zinc anode is apparent.

Example II

Two primary cells of the 675 size were prepared, utilizing silver oxide as the cathode material and amalgamated zinc powder as the anode. One of the cells (control) had a loose zinc powder anode which was not compressed. The other cell was identical except for the anode which was bonded zinc prepared in situ in the anode container. These cells were tested for their performance at room temperature (about 70° F.). The following results were obtained for a 300 ohm continuous drain to a 1.40 volt endpoint followed by a discharge to 0.90 volts:

|  | 1.40 v. Endpoint | | | 0.90 v. Endpoint | | | Total Ma. Hrs. |
|---|---|---|---|---|---|---|---|
|  | Volts | Hrs. | Ma. Hrs. | Volts | Hrs. | Ma. Hrs. |  |
| Bonded Zinc | 1.45 | 28.5 | 137 | 1.26 | 8.02 | 33.6 | 170.6 |
| Loose Zinc | 1.46 | 28.5 | 137 | 1.15 | 3.55 | 13.6 | 150.6 |

The bonded zinc anode performed better when taken to the 0.90 v. endpoint.

Example III

Amalgamated silver particles were tested for their bonding properties, and bonded silver electrodes were prepared using zinc oxide as the bonding agent and a 40% potassium hydroxide bonding solution. These bonded silver electrodes were substituted for the conventional sintered silver electrodes in silver-cadmium alkaline cells and were cycled. The bonded silver electrodes retained their structure and did not disintegrate after several charging-discharging cycles.

Example IV

Eight primary alkaline cells of the AA size were prepared, utilizing manganese dioxide as the depolarizer and amalgamated zinc powder as the anode material. Four of the cells were manufactured in accordance with standard procedures, including a compressed zinc powder anode. The other cells were identical except for the zinc bonded anodes which were prepared in a cylindrical shape and were then inserted into the anode container. In addition, four competitive cells of the same type and size were purchased and also tested. All twelve of these cells were substantially identical except that the anodes of the four competitive cells contained a carboxymethyl cellulose binder for the zinc particles. These twelve cells were tested for their low temperature performance using two different tests. One test (A) was made with a 20 ohm discharge for 4 minutes per hour and 10 hours per day to a 0.93 endpoint voltage. The other test (B) had a 20 minute cycle period. The cells were discharged through a 26.89 ohm resistor for 2 minutes, and through a 1110 ohm resistor for 18 minutes. This cycle was continued until the cell voltage dropped to 1.11 volts. The following results were obtained:

| Test | Temp. (° F.) | Bonded Zinc | | Compressed Zinc | | Zinc + CMC Binder | |
|---|---|---|---|---|---|---|---|
| | | 1.11 v. (hrs.) | 0.93 v. (min.) | 1.11 v. (hrs.) | 0.93 v. (min.) | 1.11 v. (hrs.) | 0.93 v. (min.) |
| A | −20 | | 110 | | 31 | | 115 |
| A | −40 | | 96 | | 9 | | 84 |
| B | −20 | 28.33 | | 8 | | 18.26 | |
| B | −40 | 14.00 | | 3.2 | | 11.33 | |

The cells with bonded zinc anodes were superior to both of the other cells for all tests except for test A at −20° F.

Example V

Bonding agents other than zinc oxide were tested to determine whether they can be used to prepare bonded electrodes in accordance with this invention. Alakline or acid bonding solutions containing 1% by weight of solution of various bonding agents were used to treat 14% amalgamated zinc powder.

85 cc. of an acid or alkaline bonding solution was measured into a beaker and heated on a hot plate having a surface temperature of 220° F. The bonding agent was added to the hot solution and agitated until it was dissolved therein. Paper cylinders filled with 14% amalgamated zinc powder were then immersed in the hot solution and allowed to remain there for 15 minutes. Then the cylinders were removed from the solution, the paper was taken off the cylinders, and the bonded zinc was thoroughly washed in distilled water.

After the cylinders had air dried, they were visually inspected to determine the quality of the zinc bond as compared to the ZnO bonding agent. The following results were achieved, with "good bonding" indicating a bond comparable to that achieved using ZnO:

| Bonding Agent | Bonding Solution | Result |
|---|---|---|
| $Fe_2O_3$ | 20% HCL | Weaker than ZnO bond. |
| CaO | 20% HCL | Good bond. |
| $BaO_2$ | 40% KOH | Do. |
| MgO | 40% KOH | Do. |
| $Al_2O_3$ | 40% KOH | Do. |
| $Na_2SiO_3 \cdot 9 H_2O$ | 40% KOH | Do. |
| $K_2SiO_3$ | 40% KOH | Do. |
| $CaSiO_3$ | 40% KOH | Do. |

All bonding agents yielded acceptable results. Since the procedure used was that yielding best results with ZnO, the procedure could be modified to improve the bond achieved with $Fe_2O_3$.

Having completely described this invention, what is claimed is:

1. A large surface area electrode consisting essentially of amalgamated metal particles containing at least about 1% by weight of mercury, said amalgamated metal particles bonded together solely by an inorganic bonding agent selected from zinc oxide, calcium oxide, barium oxide, magnesium oxide, aluminum oxide, iron oxide, sodium silicate, potassium silicate, or calcium silicate and with an inorganic acid or alkaline bonding solution to form a bonded electrode having a unitary structure.

2. An electrode in accordance with claim 1 in which the amalgamated metal particles are coated onto and bonded to an electrically conductive element.

3. An electrode in accordance with claim 1 in which the metal particles are amalgamated zinc.

4. An electrode in accordance with claim 1 in which teh metal particles are amalgamated silver.

5. An electrode in accordance with claim 1 in which the metal particles are amalgamated cadmium.

6. An electrode in accordance with claim 1 in which the metal particles are amalgamated copper.

7. An electrode in accordance with claim 1 in which the metal particles are amalgamated lead.

8. A method for preparing a large surface area electrode which comprises forming an intimate mixture of amalgamated metal particles containing at least about 1% by weight of mercury, as inorganic bonding agent selected from zinc oxide, calcium oxide, barium oxide, magnesium oxide, aluminum oxide, iron oxide, sodium silicate, potassium silicate or calcium silicate, and a bonding solution, heating the amalgamated metal particles to a temperature ranging from about 150° F. to about 250° F. while in contact with the bonding agent and the bonding solution, and recovering a structurized, bonded electrode.

9. A method in accordance with claim 8 in which the bonding solution is alkaline.

10. A method in accordance with claim 8 in which the bonding solution is acid.

11. A method in accordance with claim 8 in which the amalgamated particles are heated prior to bringing them into contact with the bonding solution, and maintained in a heated condition when brought into contact with the bonding solution.

12. A methd in accordance with claim 8 in which the bonding solution is heated prior to bringing it into contact with the amalgamated metal particles, and maintained in a heated condition when brought into contact with the amalgamated metal particles.

13. A method in accordance with claim 8 in which the amalgamated metal particles are admixed with the inorganic bonding agent prior to bringing them into contact with the bonding solution.

14. A method in accordance with claim 8 in which the inorganic bonding agent is admixed with the bonding solution prior to bringing them into contact with the amalgamated metal particles.

References Cited

UNITED STATES PATENTS

| 2,501,673 | 3/1950 | Glassner | 136—125 |
| 2,606,941 | 8/1952 | Ruben | 136—127 |
| 2,708,683 | 5/1955 | Eisen | 136—120 |
| 2,991,325 | 7/1961 | Kordesch | 136—155 |
| 3,042,732 | 7/1962 | Kordesch | 136—125 |
| 3,048,644 | 8/1962 | Euler | 136—120 |
| 3,060,254 | 10/1962 | Urry | 136—125 |
| 3,236,696 | 2/1966 | Andre | 136—120 |

WINSTON A. DOUGLAS, *Primary Examiner.*

C. F. LEFOUR, *Assistant Examiner.*

U.S. Cl. X.R.

136—125; 252—512